May 16, 1961  H. H. P. LEMMERMAN ET AL  2,984,727
TEMPERATURE CONTROL DEVICE
Filed Nov. 2, 1956
2 Sheets-Sheet 1

Inventors:
Harold H. P. Lemmerman,
Weyman S. Crocker,
by Roe D. McBurnett
Their Attorney.

May 16, 1961  H. H. P. LEMMERMAN ET AL  2,984,727
TEMPERATURE CONTROL DEVICE
Filed Nov. 2, 1956  2 Sheets-Sheet 2
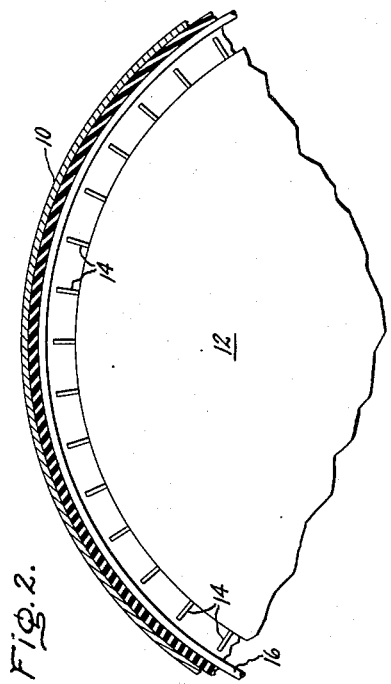
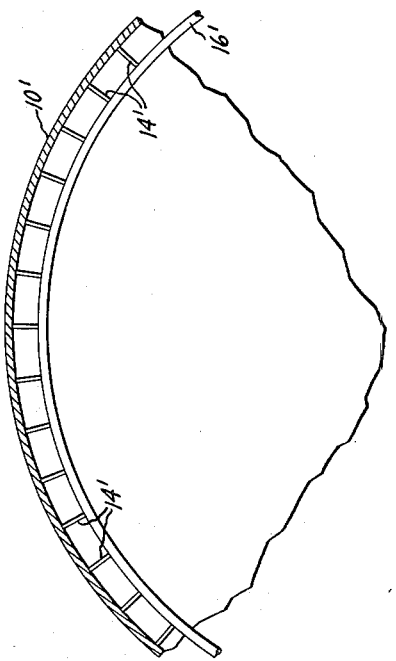
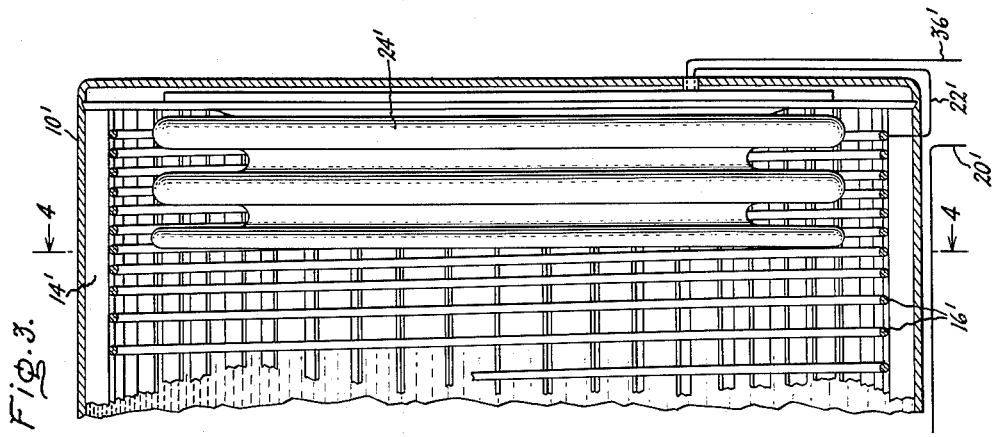
Inventors:
Harold H. P. Lemmerman,
Weyman S. Crocker,
by Roe M<sup>c</sup>Burnett
Their Attorney.

United States Patent Office 2,984,727
Patented May 16, 1961

2,984,727
TEMPERATURE CONTROL DEVICE

Harold H. P. Lemmerman, Schenectady, and Weyman S. Crocker, Scotia, N.Y., assignors to General Electric Company, a corporation of New York Filed Nov. 2, 1956, Ser. No. 620,098

5 Claims. (Cl. 219—19)

This invention relates to a temperature control device and, more particularly, to a substantially constant temperature control that utilizes the volume change of a substance in response to changes of its heat content to operate control means for a heater. This device is especially useful in gyro applications to maintain the gyro at a substantially constant predetermined temperature and prevent changes in ambient temperature from affecting the operation of the gyro.

The desirability of substantially constant temperature control devices is well known. Such devices are very useful in maintaining fixed temperatures for thermocouples, crystal oscillators, and many types of mechanical elements where great accuracy is required. The effects of changing temperatures on such instruments or elements is very harmful and can cause such devices to function erratically. For example, in gyroscopes varying temperatures can cause a shift of gimbal balance, a gain or loss of buoyancy of a liquid supporting medium or a shifting of geometric centers of location, all of which render the gyroscope less accurate. In view of these problems there has been a constant search for a simple and highly sensitive temperature control device.

At the present time there are three general types of temperature control devices. In the first of these types, electronic devices are utilized usually to sense a change in resistance due to a change in temperature. This resistivity change is amplified and used to turn on or off some type of heater device associated with the instrument whose temperature it is desired to control. A device of this type is disclosed in Patent No. 2,760,046 for an "Electronic Temperature Control Device," issued August 21, 1956, to F. N. Rothacker. An electronic temperature controller may use electron tubes, transistors, magnetic amplifiers or other well known electronic devices. While these electronic temperature controllers are capable of maintaining an accurate temperature, they are generally very expensive, bulky, and due to complexity of circuitry, they are subject to breakdown.

A second type of temperature control utilizes a bimetallic switch or thermostat to sense a change in temperature. In many instances these bimetallic thermostats are used with a relay or amplifier to provide an accurate temperature sensing device. However, the relay is subject to mechanical damage from vibrations or other types of shock and consequently such temperature control devices are too delicate for many applications. Where no relay or amplifier is used the accuracy of the device is objectionably low and may vary over a range of 10 degrees centigrade.

A third type of temperature control which is used frequently in gyroscope applications generally consists of a metal tube filled with a liquid surrounding the gyroscope. This tube in general samples the temperature present about the gyroscope, i.e. the temperature of the gyroscope itself. A change in this temperature provides a contraction or expansion of the liquid which is utilized to actuate a switch turning a heater unit on and off. While this type of temperature control can maintain a constant temperature within close tolerances, high ambient temperatures can stretch the system and render the control useless.

In addition to the problem of obtaining a proper temperature device, it is also necessary to design the device so that the temperature sensitive unit is located in the position where temperature variation creates a problem. The heater utilized must be controlled to keep the variation at this point below predetermined limits. The problems of positioning the sensing element and positioning the heater unit are just as important as finding a simple temperature control device.

Therefore, it is the principal object of this invention to provide a substantially constant temperature control that will maintain a given temperature within very narrow limits.

It is a further object of this invention to provide a new and improved temperature control for maintaining a constant temperature that is light in weight, inexpensive and of rugged construction.

Another object of this invention is to provide a temperature control device provided with a temperature sensitive element positioned so as to sense the most troublesome temperature variations and operating a heater unit to control the troublesome temperature variation.

In carrying out this invention in one form, a container is provided to contain the object, such as an electric motor driven gyroscope, whose temperature it is desired to control. This container in turn is placed within a can or housing, which is provided with heating means. A volume sensitive device is attached to the can and connected so as to operate a switch to energize or de-energize the heating means. The interior of the can is filled around the container and in intimate thermal relation therewith with a substance having a high heat of fusion and undergoing a large volume change for a change of state from solid to liquid and vice versa. The substance used is one which is a solid at normal ambient temperatures and in a solid-liquid state, i.e. part solid and part liquid, at the desired predetermined control temperature. As the heat content of the substance is varied by the transfer of heat to or from the container, a portion of the substance undergoes a change of state, expanding or contracting, thereby actuating the volume sensitive device to turn the heater unit on and off. With the change of state, heat of fusion is absorbed or given off at constant temperature, whereby the desired predetermined control is maintained within narrow limits.

Of course, where the temperature variation occurs within the device to be controlled, the invention takes another form. In this form a housing filled with a substance which is present in a solid-liquid state at the desired control temperature is placed within the device at the point of temperautre variation. This housing is provided with heating means, energized and deenergized by a switch, which is actuated by a volume sensitive device. As its heat content varies a portion of the substance begins to change state, causing a change in its volume. This volume change is sensed by the volume sensitive device, which actuates the switch to turn the heating means on or off. With a change of state the substance absorbs or gives off heat of fusion to maintain the desired temperature substantially constant.

This invention will be better understood from the following description taken in connection with the accompany drawings wherein:

Figure 2 is a partial sectional view taken on the line 2—2 of Figure 1.

Figure 3 is a sectional view of one end of another form of the invention,

Figure 4 is a partial sectional view taken on the line 4—4 of Figure 3.

Figure 1:
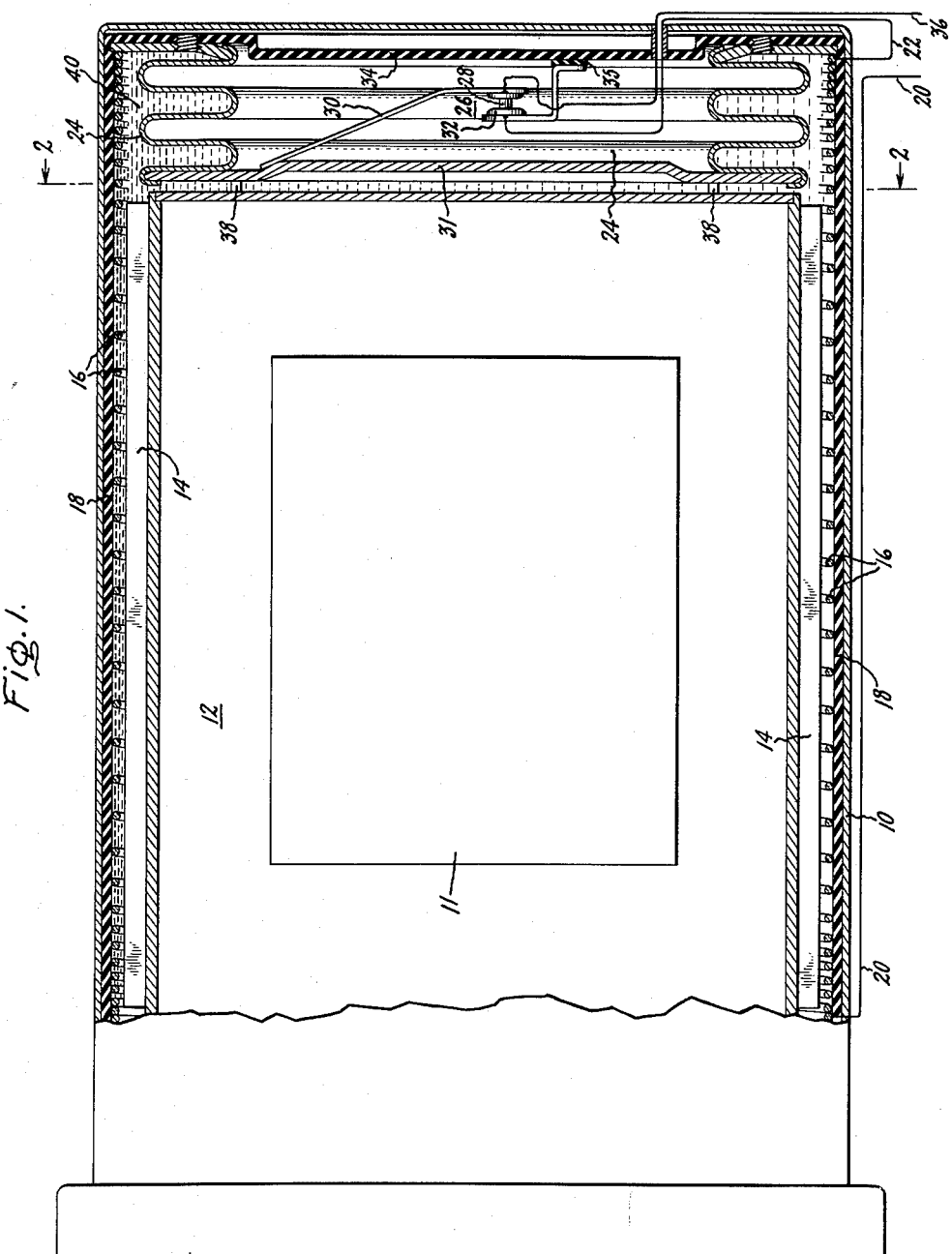
Figure 1 is a plan view partly in section showing one form of the invention.

Referring to the drawings wherein like numerals are used to indicate like parts throughout, and especially with reference to Figure 1, this invention in one form is shown as comprising a can or housing 10 having mounted therein a container 12 designed to contain a device 11, such as an electric motor driven gyroscope, whose temperature it is desired to maintain at a predetermined substantially constant value. Obviously, the size and shape of the housing 10 and the container 12 will depend on the size and shape of the device to be controlled. For purposes of illustration the housing 10 is shown in the form of a cylinder, having therein the cylindrical container 12. The container 12 is provided with a plurality of heat conducting vanes 14 mounted on its periphery in equally spaced relation and extending substantially along the length thereof. The placement of the vanes 14 about the periphery is best shown in Figure 2. Heating means are provided within the housing 10. In the preferred embodiment shown in Figure 1 the heating means takes the form of a wire heating coil 16 which is mounted within the housing 10 on the inside of a layer of heat insulation 18. Insulation 18 is necessary to prevent heat losses from the housing 10.

While the heating means 16 may be mounted on the outside of the insulation 18 or on the outside of housing 10, it has been discovered that the temperature control is more efficient and precise when the heating means is mounted directly in the area of the inside of housing 10 that it is desired to heat.

The heating means 16 may take the form of a self-supporting coil which may be plugged into the housing 10. However, for purposes of illustration it is shown with electric power leads 20, 22 taken off from its lower and upper ends respectively. For best results the heating coil should be wound as shown with more closely spaced turns at each end. This is necessary since the ends can not be as well heat insulated as the sides of the housing because of the necessity of bringing out electric leads for energizing the heater unit 16 and the device 11 enclosed within the container 12.

One end of the housing 10 is provided with a volume-sensitive device, illustrated in Figure 1 as a metal bellows 24. Within the bellows 24 is a switch 26. The switch 26 is shown in the form of a contact 28 on a leaf spring 30 having one end connected to the movable end wall 31 of the bellows 24 and a contact 32 connected to the bellows base 34 with electrical insulation 35. The base 34 is mounted on one end of the housing 10. The lead 20 of the heater unit 16 goes to one side of a source of electric current while the lead 22 is electrically connected to the contact 32 of the switch 26, the contact 28 of the switch 26 being connected to the other side of the source of electric current by a lead 36.

As the bellows 24 is compressed its movable end wall 31 moves inward and the contacts 28, 32 of switch 26 are disengaged. Should the bellows 24 be completely compressed the leaf spring 30, carrying the contact 28, will bend, but the contacts 28, 32 will not become engaged. Conversely, as the bellows 24 expands the contacts 28, 32 are engaged. Stops 38 are provided on the top of the container 12 to prevent bellows 24 from expanding far enough to have an intimate thermal contact with container 12, which would cause a heat transfer from the container 12 to the bellows 24.

The interior of housing 10 is filled with a substance which is present in a solid-liquid state at the desired control temperature. The substance, shown diagramatically as 40, surrounds the top and sides of the container 12 and the bellows 24. The vanes 14 on container 12 are substantially completely immersed in the substance 40, and form an intimate thermal relation between the substance and the container 12. These vanes 14 conduct the heat of the substance 40 to the interior of container 12, or conversely conduct heat from the interior of the container to the substance 40, to hold the device placed in the container at the desired control temperature. As substance 40 changes state, because of variation of its heat content, it expands or contracts, operating the bellows 24, which in turn actuates the switch to turn the heater unit 16 off or on. The substance 40 gives off or absorbs heat of fusion at a constant temperature as it changes state, thus maintaining substantially constant the temperature of the device placed in container 12.

The substance 40 may be any one of a number of compounds which undergoes a large change in volume during a change of state from solid to liquid and vice versa. The particular substance used will be one that changes state at the desired control temperature. The following list gives a number of compounds which may be used, with the temperature at which they change state and the percentage of volume change during such change of state. It is to be understood that these examples are for purposes of illustration only since there are many other well-known compounds which exhibit similar properties.

*Table of properties during fusion*

| Name | Formula | T ° C. | Percent ΔV |
| --- | --- | --- | --- |
| Phenathrene | $C_{14}H_{10}$ | 97.5 | 6.4 |
| Anthraquinone | $C_{14}H_8O_2$ | 284.5 | 17 |
| Anthracene | $C_{14}H_{10}$ | 216.5 | 12.8 |
| Triphenyl amine | $C_{18}H_{15}N$ | 127 | |
| Naphthalene | $C_{10}H_8$ | 79 | 12.6 |
| P-nitrophenol | $C_6H_5NO_3$ | 112 | 8.1 |
| Stearic acid | $C_{18}H_{36}O_2$ | 71.5 | 13.3 |
| Ethyl-nitrite | $C_2H_5NO_2$ | 81.5 | 12.2 |
| Benzene | $C_6H_6$ | 5.4 | 13.3 |
| Methane | $CH_4$ | −184 | 8.7 |
| Ammonium chloride | $NH_4Cl$ | 184 | 6.5 |

The operation of the invention will be described for an electric motor driven gyroscopic application. For most accurate operation, the gyroscope should be held at a substantially constant temperature higher than any ambient temperature to which it might be subjected. The gyroscope 11 is mounted for rotation within the container 12 which is then hermetically sealed. The container 12 is then fixedly attached within the insulated housing 10, as by mounting it on the end 42. The electric leads from the gyroscope are brought out through seals in end 42 in a manner well known in the art, as for example glass to metal seals. With the bellows 24, switch 26 and heater unit 16 in place within the insulated housing 10, substance 40 is added to completely fill the inside of housing 10. Since it is desired to operate the gyroscope at a temperature of 79° C., which is higher than any likely ambient, naphthalene preferably is used.

The housing 10 is evacuated and then filled with hot naphthalene by means of any desired filling apparatus. The filling apparatus used was provided with a heater to liquify the naphthalene. A heated glass tube carried the liquid naphthalene from a reservoir to the housing 10. With the filling heater and the heater 16 both on the liquid naphthalene pours into the housing 10. When the naphthalene stops pouring into the housing 10, a cutoff between the naphthalene reservoir and the glass tube is closed. Then the heater unit 16 is disconnected from the source of electric current so that the naphthalene in the housing 10 can solidify. The total change in volume is noted on the glass tube. A variac is then connected to the heater unit 16 and the desired liquid to solid ratio is obtained. This is done by noting the expansion of the naphthalene in the glass tube as the naphthalene in the housing 10 is heated. For most applications a ratio of approximately 50% solid to 50% liquid is desirable. Of course, where very high ambients are expected a larger ratio of solid is desirable. When the desired ratio is obtained the filling apparatus is removed and the housing 10 is sealed.

After sealing the housing 10, the heater unit 16 is connected to a source of electric current. At this time the bellows 24 is expanded and the switch 26 is closed. This energizes the heater unit 16, which supplies heat to the naphthalene. As heat is absorbed by the naphthalene, a part of a solid portion is liquified, thus expanding and causing the bellows to contract. The depressing of bellows 24 will open switch 26, turning heater unit 16 off.

Naphthalene changes state at approximately 79° C., and as it changes from a liquid to a solid it gives off heat of fusion which is conducted to the container 12 by vanes 14. Also the naphthalene by changing state from the solid to the liquid can absorb heat of fusion and thus prevent the interior of container 12 from being raised above 79° C., such as by heat generated in the electrically driven gyroscope 11. The cycling of the heater unit with the changes of the naphthalene will continue as long as desired, whereby the temperature of gyroscope 11 within the container 12 is held sustantially constant within narrow limits; with a typical control at 79° C.±.5° C.

Another form of the invention is shown in Figures 3 and 4. This form of the invention is used where the troublesome temperature variation occurs within the device to be controlled. In this embodiment the invention is shown as comprising a housing 10' having a plurality of heat conducting vanes 14' equally spaced about its inner wall. Of course, the size and shape of the housing 10' will depend on the size and shape of the device to be controlled. For purposes of illustration only it is shown in cylindrical form. Heating means are provided within the housing 10'. In Figure 3 the heating means is shown in the form of a wire heating coil 16' mounted within housing 10' on the inside of heat conducting vanes 14'. The mounting of the heating means 16' and heat conducting vanes 14' is best shown in Figure 4.

Heating means 16' may take the form of a self-supporting coil; however, for purposes of illustration it is shown with electric power leads 20', 22', taken off from opposite ends of heating coil 16'.

Mounted within one end of housing 10' is a volume-sensitive device illustrated as a metal bellows 24'. Within bellows 24' is a switch (not shown) mounted in the same manner as shown in Figure 1. The switch is connected between leads 22' and 36', while leads 20' and 36' are connected to a source of electric current.

The interior of housing 10' is filled with a substance which is present in a solid-liquid state at the desired control temperature. The heat conducting vanes 14' are substantially completely immersed in the substance, shown diagrammatically as 40'. These vanes 14' aid in conducting the heat from the substance 40' to the exterior of housing 10', to hold the interior of the device within which it is placed at the desired control temperature. As the substance 40' changes state because of a variation of its heat content, it changes volume. The change of volume operates the bellows 24', which actuates the switch to turn the heater unit 16' on or off, as previously explained with reference to Figure 1. The substance 40' gives off or absorbs heat of fusion at a constant temperature as it changes state, thus maintaining the desired control temperature of the device within which the housing 10' is placed. The operation of this embodiment is as explained for the embodiment shown in Figure 1.

By use of this invention it is possible to obviate the problems of temperature variations heretofore encountered. The temperature control device of this invention may be placed any point that the troublesome temperature variations occur and will maintain a substantially constant temperature at such point.

Various modifications will appear obvious to those skilled in the art. The embodiments shown and described are by way of example only, since many substitutions may be made without departing from the spirit and scope of the invention as defined in the appended claims.

What is claimed as new and which is desired to secure by Letters Patent is:

1. A substantially constant temperature control device comprising a heat insulated, closed housing, a substance in said housing in a solid-liquid state at a predetermined temperature, a bellows mounted within said housing in operable contact with said substance, a switch mounted in said bellows and connected to be actuated by said bellows, and a heater unit controlled by said switch for heating said substance whereby a variation of heat in said substance causes a change of state in said substance with a consequent volume change and operation of said bellows to actuate said switch to control said heater unit so as to maintain said predetermined temperature.

2. A substantially constant temperature control device comprising a closed housing, a substance in a solid-liquid state within said housing, volume-sensing means mounted within said housing in thermal contact with said substance, a switch mounted in said volume-sensing means for actuation by said volume-sensing means, heating means positioned to provide heat to said substance, and electrical means connecting said switch to said heating means whereby as said substance changes state in response to changes in heat content said volume-sensitive device is operated to actuate said switch to turn said heater unit on and off and maintain said substance at a substantially constant temperature.

3. In a device to maintain an object at a substantially constant temperature, a closed housing, a container for an object within said housing, volume-sensitive means mounted within said housing, a substance filling said housing about said container in heat conducting relation therewith and engaging said volume-sensitive means, said substance being in a solid-liquid state at a predetermined temperature, a switch completely enclosed by said housing and connected to be actuated by said volume-sensitive means, heating means connected to be energized by said switch, said heating means being positioned to provide heat to said substance whereby a variation of heat causes said substance to change state with a consequent volume change which is sensed by said volume-sensitive means for actuation of said switch to control said heating means.

4. A substantially constant temperature control device comprising a heat insulated housing, a container mounted within said insulated housing adapted to contain an object whose temperature is to be controlled, volume-sensitive means mounted within said insulated housing, a substance within and completely filling said housing about said container in heat conducting relation therewith and in engagement with said volume-sensitive means, vanes mounted on said container and completely immersed in said substance said substance having a high heat of fusion and being in a solid-liquid state at the predetermined temperature to be maintained, heating means mounted in said housing, and a switch connected to be actuated by said volume-sensitive means for controlling the flow of electric current to said heating means whereby a portion of said substance changes state as its heat content varies causing a movement of said volume-sensitive means for actuation of said switch to control said heating means.

5. A substantially constant temperature control device comprising a housing, a volume-sensitive device mounted within said housing, a substance in a solid-liquid state at a predetermined temperature filling said housing in engagement with said volume-sensitive device, a plurality of heat conducting vanes mounted on the inside of a wall forming said housing for conducting heat from said substance to said wall of said housing, and heating means controlled by said volume-sensitive device for heating said substance whereby as said substance varies in heat content it changes volume to actuate said volume-sensitive means to control said heating means to maintain said housing at the predetermined temperature.

References Cited in the file of this patent

UNITED STATES PATENTS

| | | |
|---|---|---|
| 1,367,122 | Chubb et al. | Feb. 1, 1921 |
| 1,874,909 | Conklin | Aug. 30, 1932 |
| 1,921,433 | Hovgaard | Aug. 8, 1933 |
| 2,524,886 | Colander et al. | Oct. 10, 1950 |
| 2,595,814 | Rich et al. | May 6, 1952 |
| 2,726,681 | Gaddis et al. | Dec. 13, 1955 |
| 2,762,895 | Throw | Sept. 11, 1956 |
| 2,789,184 | Matthews | Apr. 16, 1957 |
| 2,827,534 | Grayson | Mar. 18, 1958 |

FOREIGN PATENTS

| | | |
|---|---|---|
| 58,171 | Denmark | Nov. 4, 1940 |

OTHER REFERENCES

"Constant-Temperature Oven for Crystal Quartz Oscillator." Industrial Heating, vol. XXIII, No. 7, July 1956, 219–1900 (pp. 1460, 1462, 1464).